United States Patent [19]
Stüble

[11] Patent Number: 5,114,444
[45] Date of Patent: May 19, 1992

[54] FILTER ARRANGEMENT INCLUDING AT LEAST ONE DRUM-TYPE FILTER

[75] Inventor: Helmut Stüble, Spartanburg, S.C.

[73] Assignee: LTG Lufttechnische GmbH, Stuttgart, Fed. Rep. of Germany

[21] Appl. No.: 627,056

[22] Filed: Dec. 13, 1990

[30] Foreign Application Priority Data

May 29, 1990 [DE] Fed. Rep. of Germany ....... 4017206

[51] Int. Cl.⁵ ............................................. B01D 46/04
[52] U.S. Cl. ..................... 55/294; 15/312.1; 15/395
[58] Field of Search ............ 55/294; 210/413; 15/312.1, 312.2, 395

[56] References Cited

U.S. PATENT DOCUMENTS

| | | | |
|---|---|---|---|
| 4,154,588 | 5/1979 | Herndon, Jr. | 55/283 |
| 4,251,237 | 2/1981 | Smith | 55/294 |
| 4,364,755 | 12/1982 | Ferri | 55/290 |

FOREIGN PATENT DOCUMENTS

| | | | |
|---|---|---|---|
| 118299 | 3/1944 | Australia | 55/294 |
| 604096 | 10/1934 | Fed. Rep. of Germany | |
| 1077718 | 8/1967 | United Kingdom | 15/312.1 |

Primary Examiner—W. Gary Jones
Assistant Examiner—Matthew O. Savage
Attorney, Agent, or Firm—Toren, McGeady & Associates

[57] ABSTRACT

A filter arrangement includes at least one drum-type filter. A suction device is provided for suctioning of the inside of the drum-type filter along a helical line. The suction device includes at least one suction hose and a suction nozzle provided at the free end of the suction hose. The suction nozzle is constructed for contacting the inner side of the drum-type filter. The suction hose is attached to an end portion of a rotatable suction pipe. The end portion is constructed so as to be movable back and forth in longitudinal direction of the drum-type filter, so that movement in longitudinal direction and rotary movement of the end portion of the suction pipe results in a suctioning-off of the cylindrical inner side of the drum-type filter along a helical line.

26 Claims, 10 Drawing Sheets

FIG. 5
FIG. 6
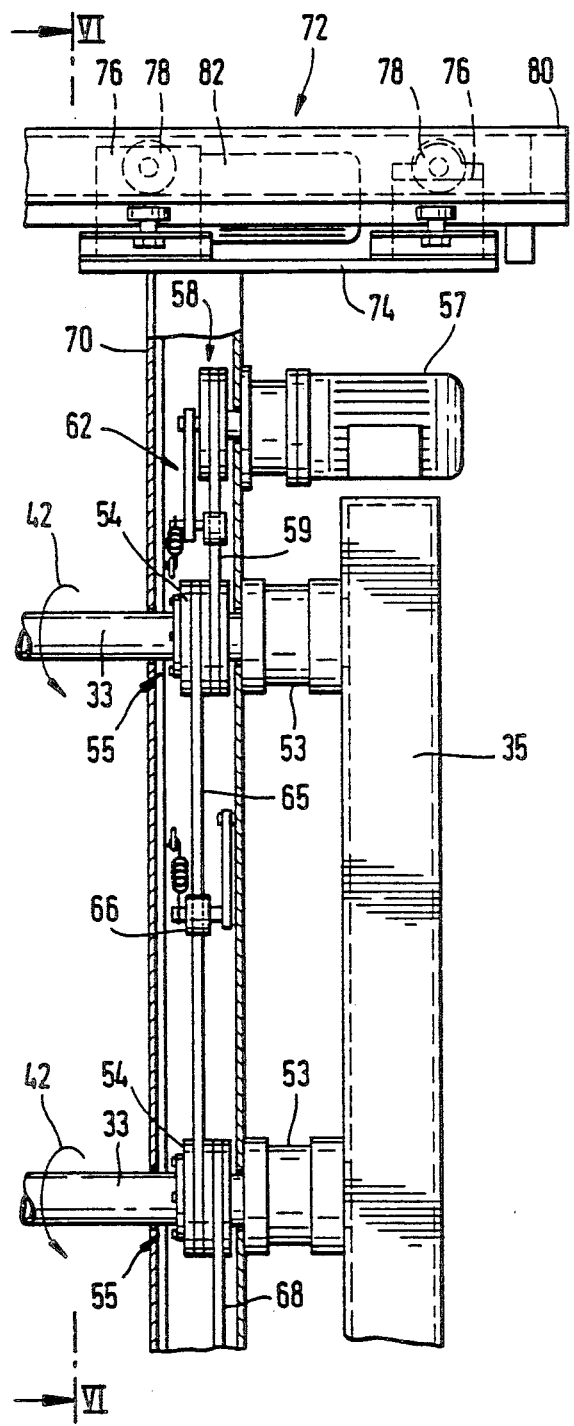
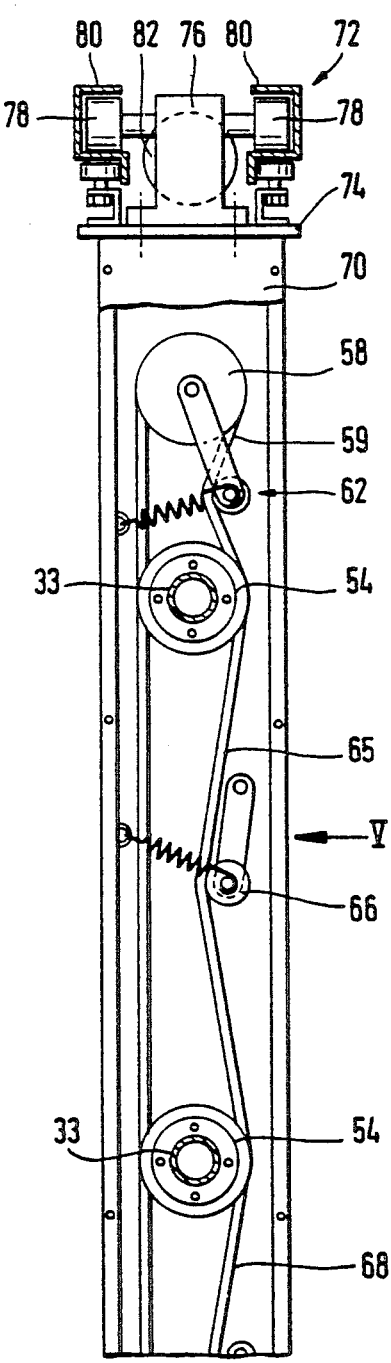

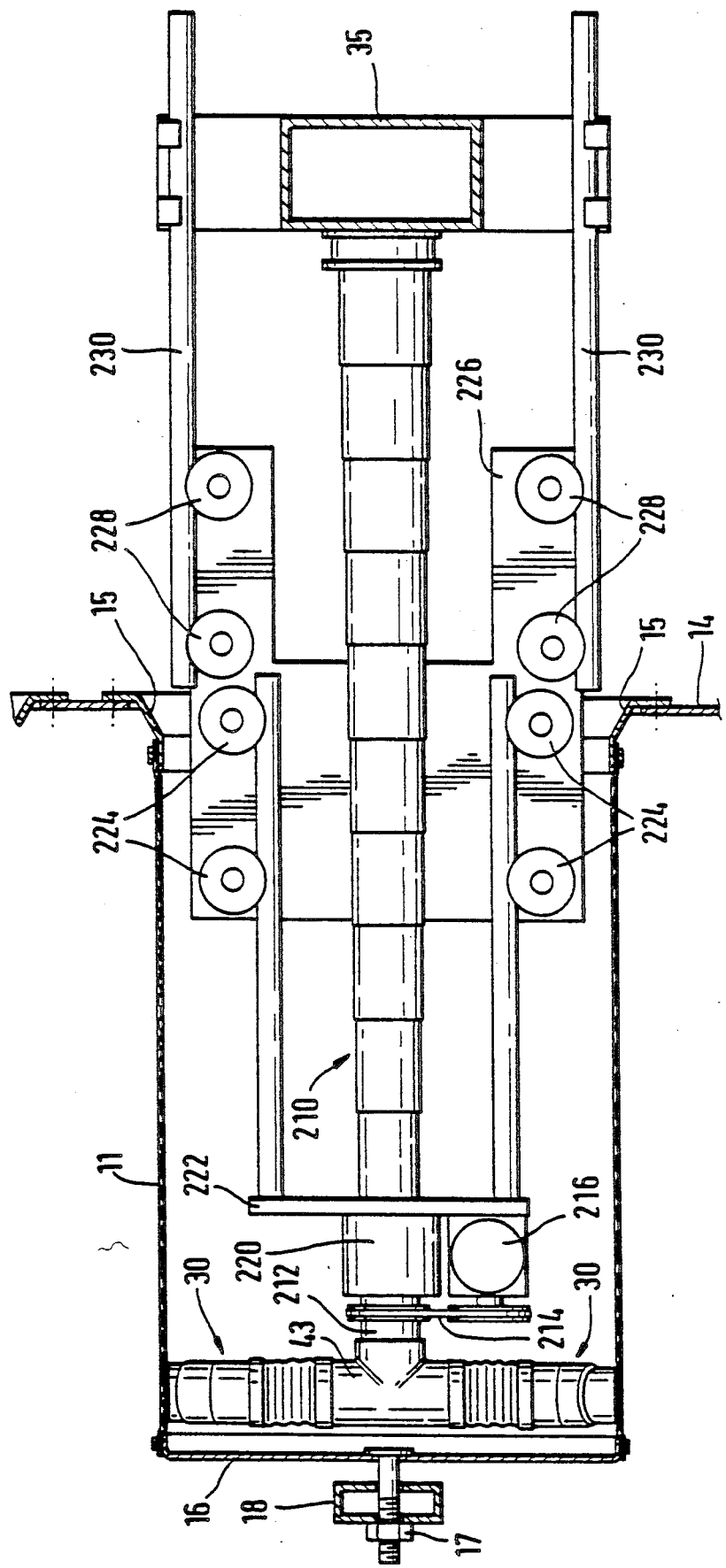

FILTER ARRANGEMENT INCLUDING AT LEAST ONE DRUM-TYPE FILTER

BACKGROUND OF THE INVENTION

The present invention relates to a filter arrangement including a drum-type filter, wherein flow occurs from the inside of the filter to the outside. The filter arrangement further includes a suction device for suctioning-off the inside of the drum-type filter along a helical line.

SUMMARY OF THE INVENTION

It is the object of the present invention to improve the filter arrangement of the above-described type. In particular, a filter arrangement is to be provided which is of smaller construction than the filter arrangements known in the past.

In accordance with the present invention, the filter arrangement includes at least one preferably elastic suction hose and a suction nozzle provided at the free end of the suction hose. The suction nozzle is preferably constructed for contacting the inner side of the drum-type filter. The suction hose is attached to the end portion of a rotatable suction pipe. The end portion of the suction pipe is constructed so as to be movable back and forth in longitudinal direction of the drum-type filter. As a result, the movement in longitudinal direction and the rotary movement of the end portion of the suction pipe result in a suctioning-off of the cylindrical inner side of the drum-type filter along a helical line.

In accordance with a preferred feature of the present invention, the suction pipe is mounted on a moving device for moving the suction pipe in longitudinal direction of the drum-type filter. The longitudinal moving device, in turn, is suspended from a transverse moving device which makes it possible to move the suction pipe transversely in order to be able to suction off parallel columns of drum-type filters in any selected sequence.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

BRIEF DESCRIPTION OF THE DRAWING

In the drawing:

FIG. 5 is a view of the drive of the suction pipes seen in the direction of arrow V of FIG. 6;

FIG. 6 is a sectional view taken along sectional line VI—VI of FIG. 5;

FIG. 12 is a side view of a fourth embodiment of the filter arrangement according to the present invention including a different type of suction pipe.

DESCRIPTION OF THE PREFERRED EMBODIMENTS

Figure 1:
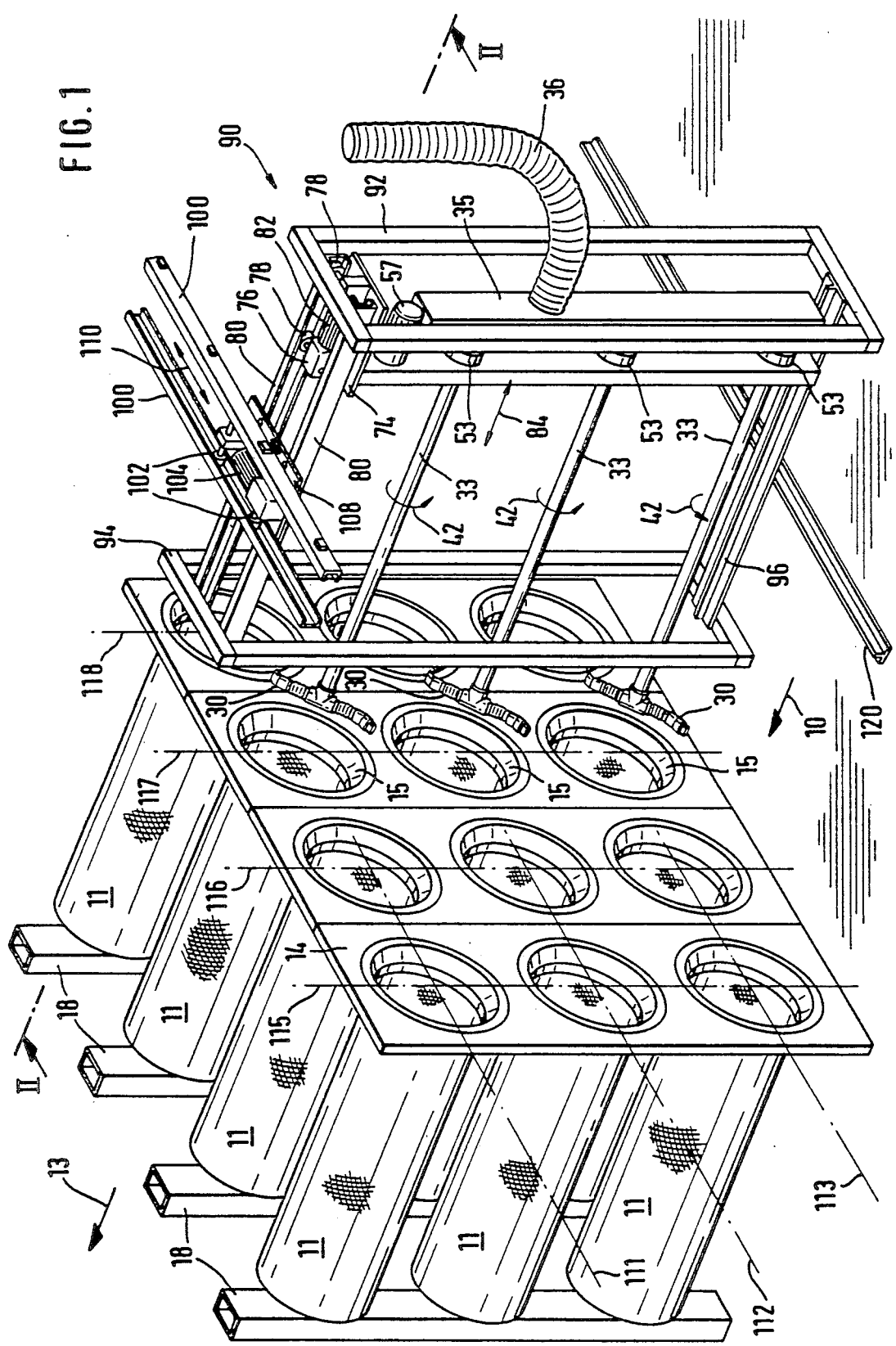
FIG. 1 is a perspective view of a first embodiment of the filter arrangement according to the present invention, with twelve drum-type filters arranged in the manner of a matrix and with a device for simultaneously suctioning-off three of the twelve filters.

FIG. 1 of the drawing shows a first preferred embodiment of the filter arrangement according to the present invention. The filter arrangement is approximately room-sized. Air containing fibers, dust or the like, for example, from spinning mills or other plants in the textile industry, arrive in the direction of arrow 10, flow through drum-type filters 11 and the cleaned air flows off in the direction of arrow 13. In the illustrated embodiment, twelve filters 11 are arranged in the manner of a matrix.

Figure 2:
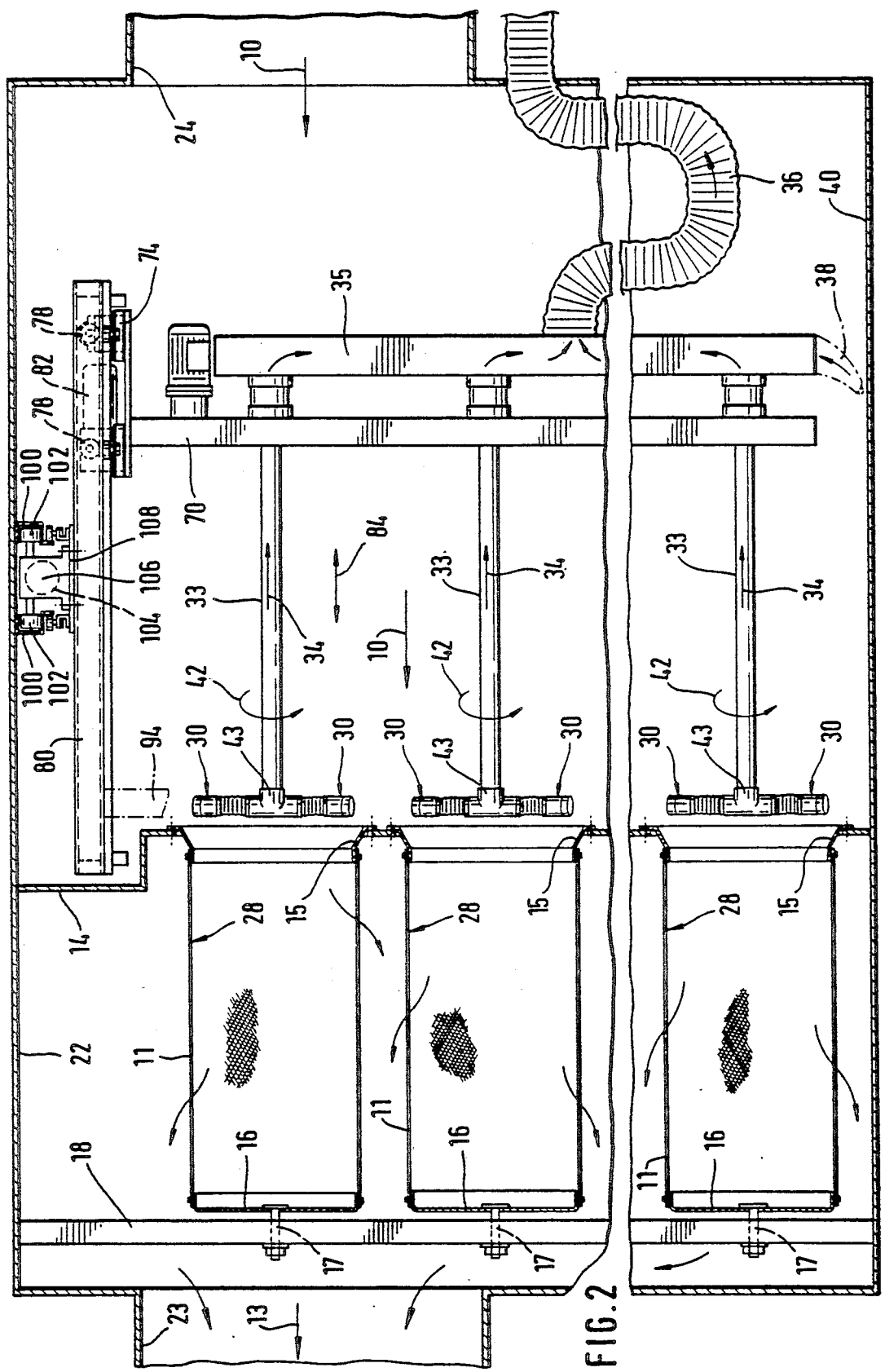
FIG. 2 is a sectional view taken along sectional line II—II of FIG. 1.

The drum-type filters 11 are circular cylindrical filter surfaces and extend over almost the entire length of the filter drums. The filters 11 are of filter cloth, fabric, gauze, non-woven fabric, knitted fabric, metal fabric, screens, grating or the like as it is required for the specific case of application. The filters are fastened at a front wall 14 by means of a truncated cone-shaped, rigid transition piece 15. As can be seen in FIG. 2, they have a solid bottom 16 which is connected through a tightening bolt 17 to a support frame 18.

The entire filter arrangement may be surrounded by an outer housing 22 which includes a discharge duct 23. The front wall 14 may be provided in the housing as a separating wall. The outer housing 22 may also include a feed duct 24.

The fibers, dust or the like to be filtered out of the air collects on the inner surfaces of the drum-type filters 11. For this reason, the inner surfaces 28 of the filters must continuously be suctioned off.

Suction hoses 30 are provided for suctioning-off the inner surfaces 28 of the filters. The suction hoses 30 are each fastened to an end portion of a rotatable suction and drive pipe 33. Thus, dust which has been suctioned off by the suction hoses from the inner surfaces 28 reaches through the suction hoses 30 the suction pipe 33, as indicated by arrow 34. From suction pipe 33, the air is conducted in a common suction box 35 which is connected through a flexible connecting hose 36 to a suction pump, not illustrated, where the fibers or the like are removed and discarded in the known manner.

The suction box 35 may at the bottom thereof have a suction nozzle 38 by means of which the fibers or dust can be suctioned off from the floor 40.

Figure 4:
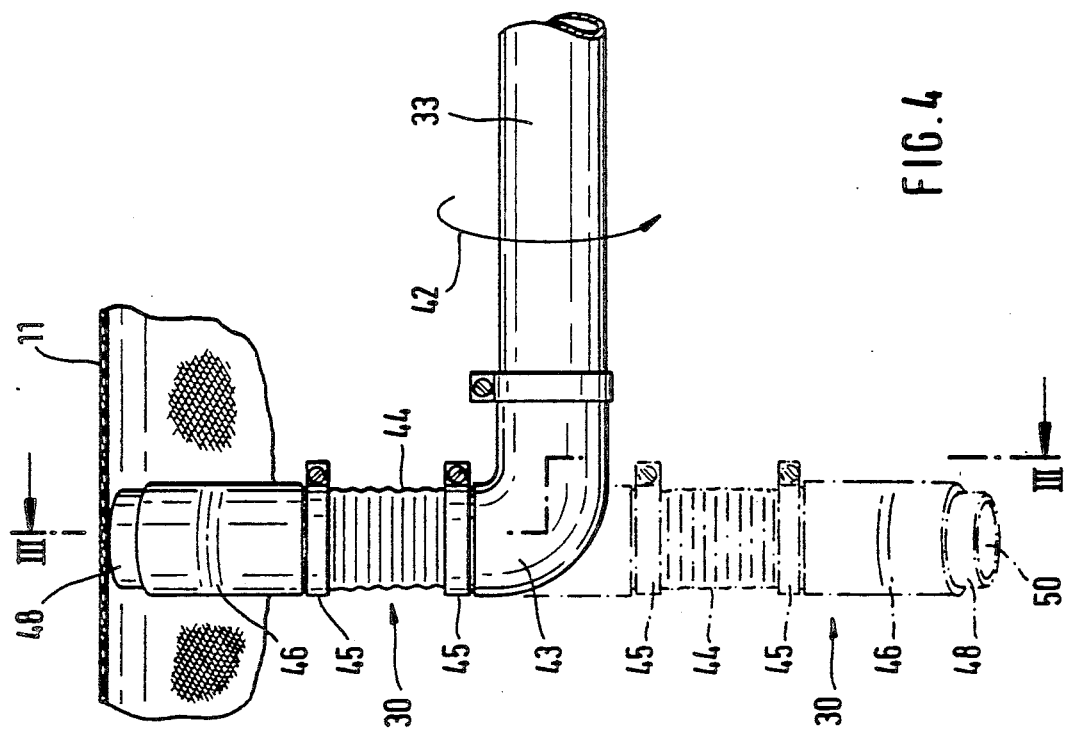
FIG. 4 is a side view of a suction hose, wherein the drum-type filter is shown only partially and in section.
Figure 3:
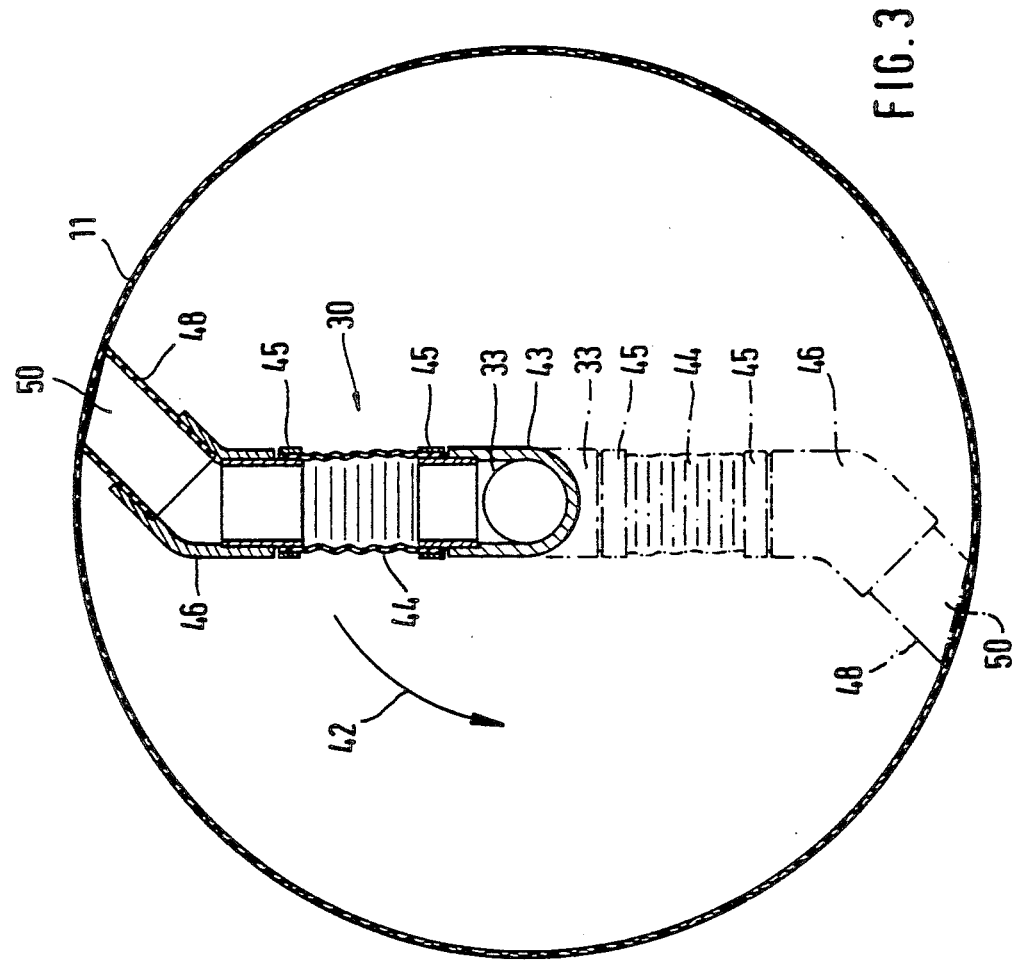
FIG. 3 is a sectional view taken along sectional line III—III of FIG. 4.

FIGS. 3 and 4 show the suction hoses 30 on a larger scale. The direction of rotation of the suction nozzles is denoted by reference numeral 42. The suction hoses 30 are connected through an angle piece 43 to the suction pipe 33. A flexible hose 44 is connected to angle piece 43. The flexible hose 44 is fastened by means of clips 45 to the angle piece 43 and to an outer angle piece or elbow piece 46. As illustrated in the drawing, the elbow piece 46 is angled against the direction of rotation 42 by approximately 40. relative to the exact radial direction. The suction nozzle 48 which gradually wears off during operation due to friction at the drum-type filter 11, is a replaceable pipe which is fastened in the angle piece 46.

Since the suction nozzle 48 is cut off obliquely, the suction opening 50 is oval. This suction opening 50 preferably moves along and contacts the inner surface of the drum-type filter 11 to be suctioned off in order to obtain a thorough cleaning action.

FIG. 5 of the drawing shows the suction box 35. The suction box 35 is connected through air-tight rotary connections 53 with the suction pipes 33. For providing the rotary drive, the connection 53 has pulleys 54 which are fastened at the front sides by means of a flange connection 55.

An electric motor 57 is used for driving the pulleys 54. The electric motor 57 drives the upper pulley 54 through a pulley 58 and a belt 59. Also provided is a tightening member or tightening roller 62 of known construction for the belt 59.

The upper pulley 54, in turn, is connected through a belt 65 to the next lower pulley 54 and this belt 6 is again provided with a tightening roller 66 of known construction. Another drive belt 68 extends from the lower pulley 54 to the next lower pulley which is not illustrated in FIGS. 5 and 6. The embodiment of FIG. 1 has three suction pipes 33 and, therefore, three pulleys 54 which are all driven by the electric motor 57 with the same direction of rotation 42 and the same rate of rotation.

The unit including the belts 59, 65, 68 is arranged in a closed box 70, so that it is protected against fine dust. The box 70 is at the top thereof suspended from a carriage 72 by means of a support rail 74 to which are rotatably connected altogether four rollers 78 through appropriate support members 76. These rollers 78 can be moved on two horizontal rails 80 by means of an electric motor 82. When the rollers 78 are moved on the rails 80, the suction pipes 33 are moved in the direction of arrow 84 shown in FIGS. 1 and 2. Since the suction pipes 33 are simultaneously rotated, the suction hoses 30 suction off the inner surfaces of the drum-type filters 11 along a helical line.

When the suction hoses 30 are at the beginning of a movement outside of the drum-type filter 11 as shown in FIGS. 1 and 2, the truncated cone-shaped transition piece 15 initially radially slightly compresses the bellows-type portions 44 which results in a certain pretension. Thus, the suction hoses 30 are moved into the filters 11 while being continuously rotated and are moved subsequently out of the filters while being continuously rotated, wherein the drive is effected by means of the electric motor 82.

The rails 80 are components of a guide frame 90 which is best illustrated in FIG. 1. The guide frame 90 includes two vertically arranged rectangular frame portions 92 and 94. The two rails 80 are fastened on the upper sides of the frame portions 92 and 94. The frame 90 has at the bottom a horizontal guide rail 96 which serves for the guidance of the lower end of the box 70, not shown in FIG. 2. Thus, a closed frame 90 is formed.

This closed frame 90, in turn, is suspended from rails 100 which are fastened at the roof of the housing 22 and extend perpendicularly relative to the rails 80. The rails 80 as well as the rails 100 are U-shaped in cross-section. The rails 100 guide four rollers 102 which can be driven by an electric motor 104. The rollers 102 carry through intermediate members 106 a plate 108 which, in turn, is rigidly connected to the upper side of the rails 80.

When the electric motor 104 is actuated in the position illustrated in FIG. 1, the frame 90 is moved in the direction of arrow 110.

As shown in FIG. 1, the twelve drum-type filters 11 are arranged in the manner of a matrix in the form of three horizontal rows 111, 112, 113 and four vertical columns 115 to 118. As also shown in FIG. 1, the frame 90 has three suction hoses 33 which are arranged vertically one above the other, so that it is always possible to work on one vertical column, for example, column 117 as shown in FIG. 1.

After the column 117 has been worked on, the frame 90 can subsequently be moved by means of the electric motor 104 to the next column 116 or even to the column 115, and can work on that column.

The arrangement according to the present invention requires fewer suction devices than there are drum-type filters and if repairs are necessary on the drum-type filters, the frame can easily pass by a column of filters.

To guide the bottom of the frame 90 when it is moved by electric motor 104, a guide rail 120 of T-shaped cross-section is provided on the floor. A guide member, not shown, provided at the underside of the frame portion 96 engages the guide rail 120.

Figure 7:
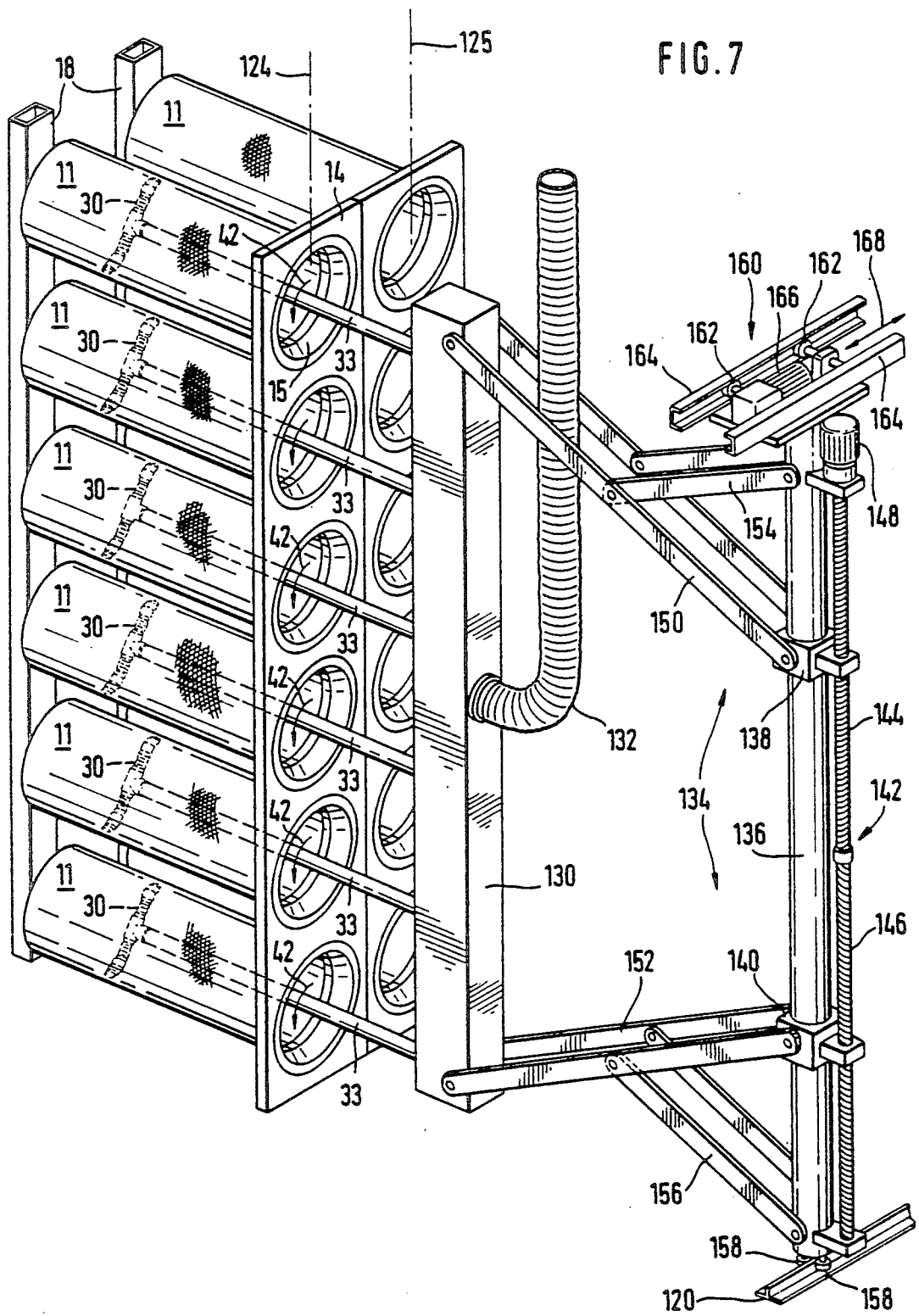
FIG. 7 is a perspective view of a second embodiment of the filter arrangement according to the present invention including a scissors-type drive.

FIG. 7 of the drawing shows an embodiment with two parallel columns 124, 125 of six drum-type filters 11 each. The filters are constructed and fastened in the same manner as in FIGS. 1-6, so that the same reference numerals are used and the above description if referred to.

The suction hoses 30 and suction pipes 33 also are the same as in the first embodiment. The suction pipes 33 are in this case mounted on a common suction box 130. A suction hose 132 is connected to the suction box 130 and leads to a suctioning-off unit, not shown. The suction box 130 also contains the drive of the suction pipe 33 which may be the same as in FIGS. 5 and 6.

In the embodiment of FIG. 7, a scissors-type drive 134 is used for horizontally displacing the suction box 130. The drive 134 has a vertical guide column 136. Two slide pieces 138, 140 are slidably arranged on the guide column 136. As shown in the drawing, the slide pieces 138, 140 are driven by means of a threaded spindle 142, the upper portion of which has a left-handed thread 144 and the lower portion has a right-handed thread 146 and which can be driven by means of an electric motor 148. The left-handed thread 144 is in engagement with an appropriate internal thread of the slide piece 138 and the right-handed thread 146 is in engagement with an appropriate internal thread of the slide piece 140. Thus, when the spindle 142 is rotated by the electric motor 148, the slide pieces 138, 140 either move toward each other or away from each other.

A lever 150 extends from the slide piece 13 to the upper end of the suction box 130 and a lever 152 extends from the slide piece 140 to the lower end of the suction box 130. As shown in the drawing, the levers 150, 152 are pivotally attached at both ends.

A connecting lever 154 is hinged approximately to the middle of the lever 150 and its other end is hinged to the upper end of the guide column 136. Another connecting lever 156 is hinged to the middle of the lever 152 and the other end is hinged to the lower end of the guide column 136.

As shown in FIG. 7, the scissors formed by the levers 150, 154 or 152, 156 are closed when the slide piece 138 is moved upwardly, so that the suction box 130 is moved to the left as seen in FIG. 7.

On the other hand, the scissors formed by the levers 150, 154 or 152, 156 are opened when the slide piece 138 is moved downwardly, so that the suction box 130 is moved to the right as seen in FIG. 7.

Since the suction pipes 33 are rotated, a helical suction movement of the suction hoses 30 is created by the movement of the scissors-type drive described above.

The guide column 136 is at the bottom thereof guided by means of two rollers 158 on the rail 120 which is also illustrated in FIG. 1. The top of the guide column 136 is connected to a carriage 160 which is movable by means of four rolls 162 in two horizontal rails 164 which, in the same manner as rails 100 of FIGS. 1 and 2, are attached to the roof of the housing 22. The rollers 158 are also driven by an electric motor 166 and, thus, the motor 166 can move the guide column 136 in the direction of arrow 168 from the column 124 to column 125 and vice-versa. Accordingly, the second embodiment does not require the frame 90 of the first embodiment.

Figure 8:
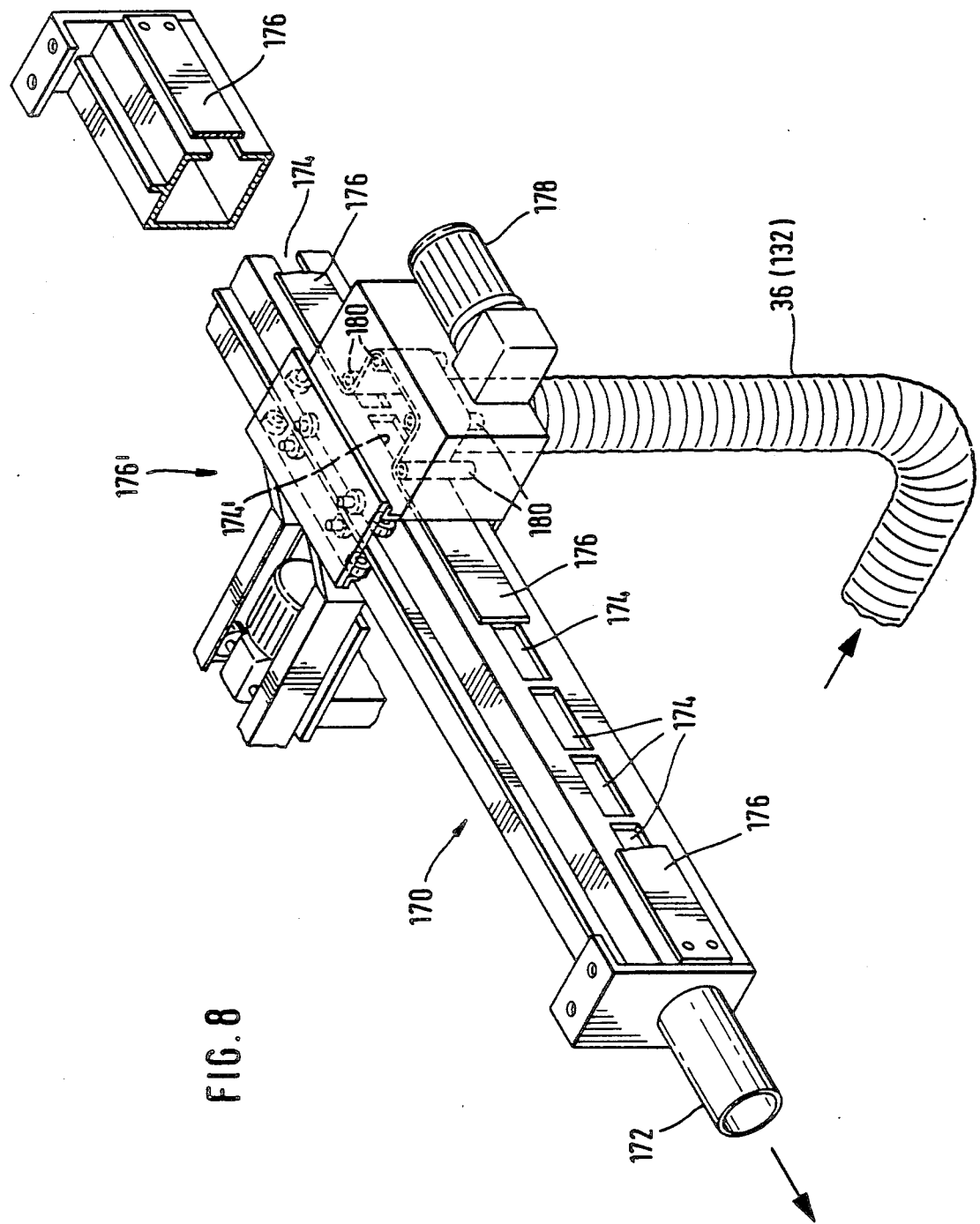
FIG. 8 shows a detail of a preferred suction device.

FIG. 8 of the drawing illustrates the manner in which the connecting hose 36 or 132 may be connected to a stationary suction unit which is connected to a stationary horizontal hollow beam 170. A pipe 172 leads from the hollow beam 170 to a suction pump, not shown.

The stationary hollow beam 170 is provided on one of its longitudinal sides with suction openings 174 which are closed by means of a flexible valve tape 176.

A carriage 176' is movable on the hollow beam 170 by means of an electric motor 178. The connecting hose 36 or 132 is attached to carriage 176'. As shown in FIG. 8, the carriage 176' has four deflection rollers 180 around which the valve tape 176 is deflected in such a way that a suction opening 174 is released. Thus, depending on the position of the carriage 176', the hose 36 or 132 is connected to a suitable suction opening 174.

Figure 9:
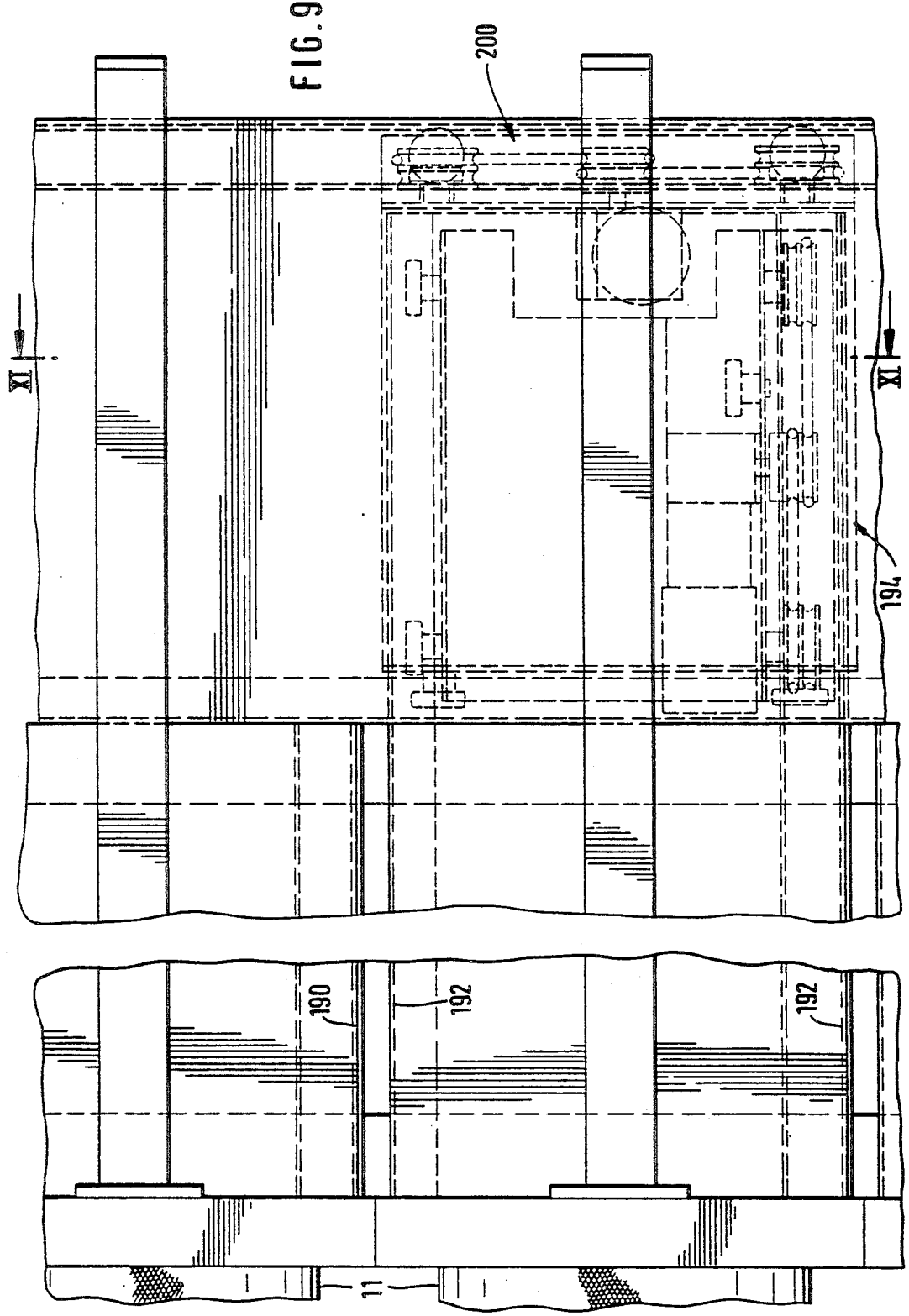
FIG. 9 is a top view of a third embodiment of the filter arrangement according to the present invention.
Figure 10:
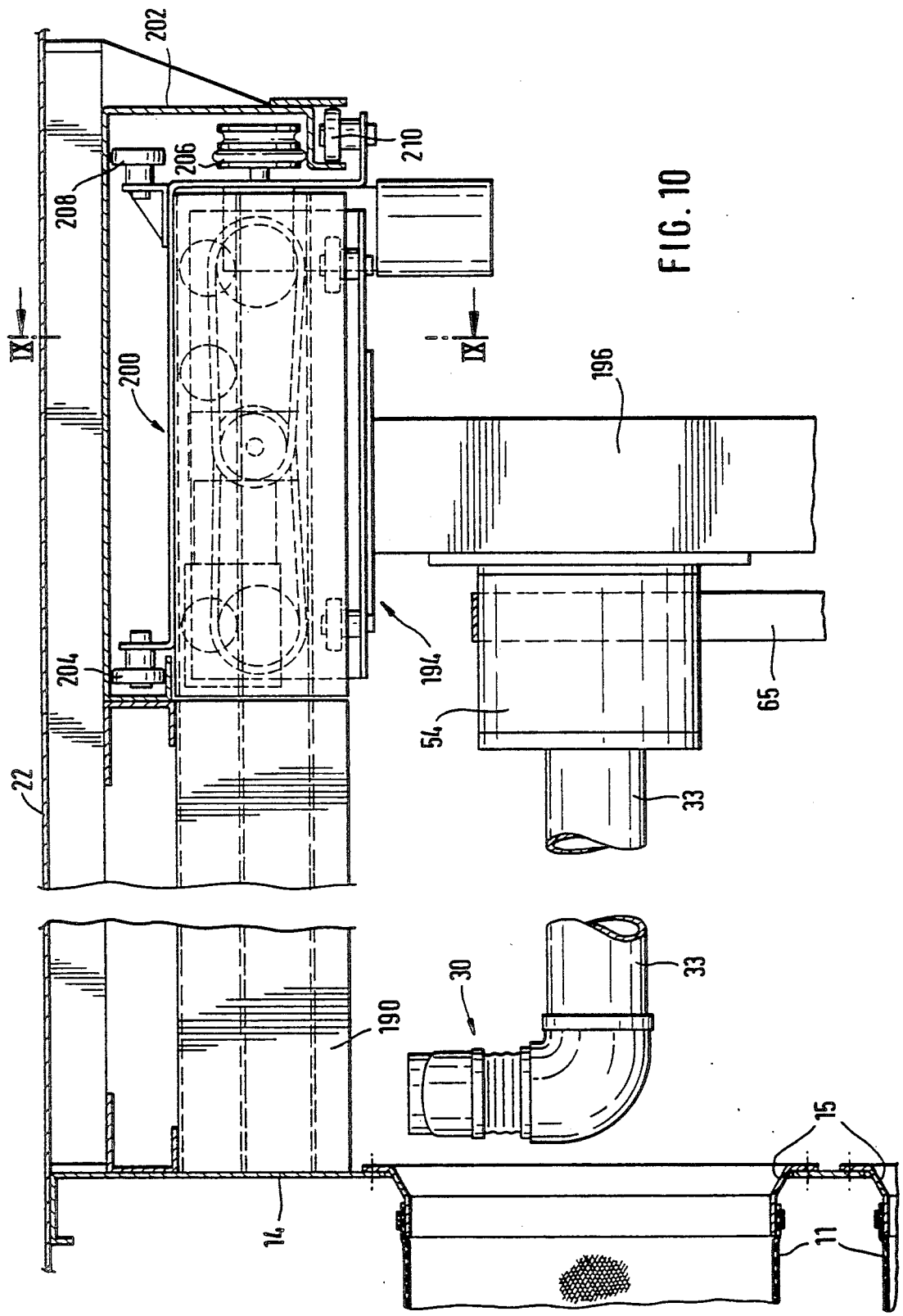
FIG. 10 is a sectional view of the third embodiment.
Figure 11:
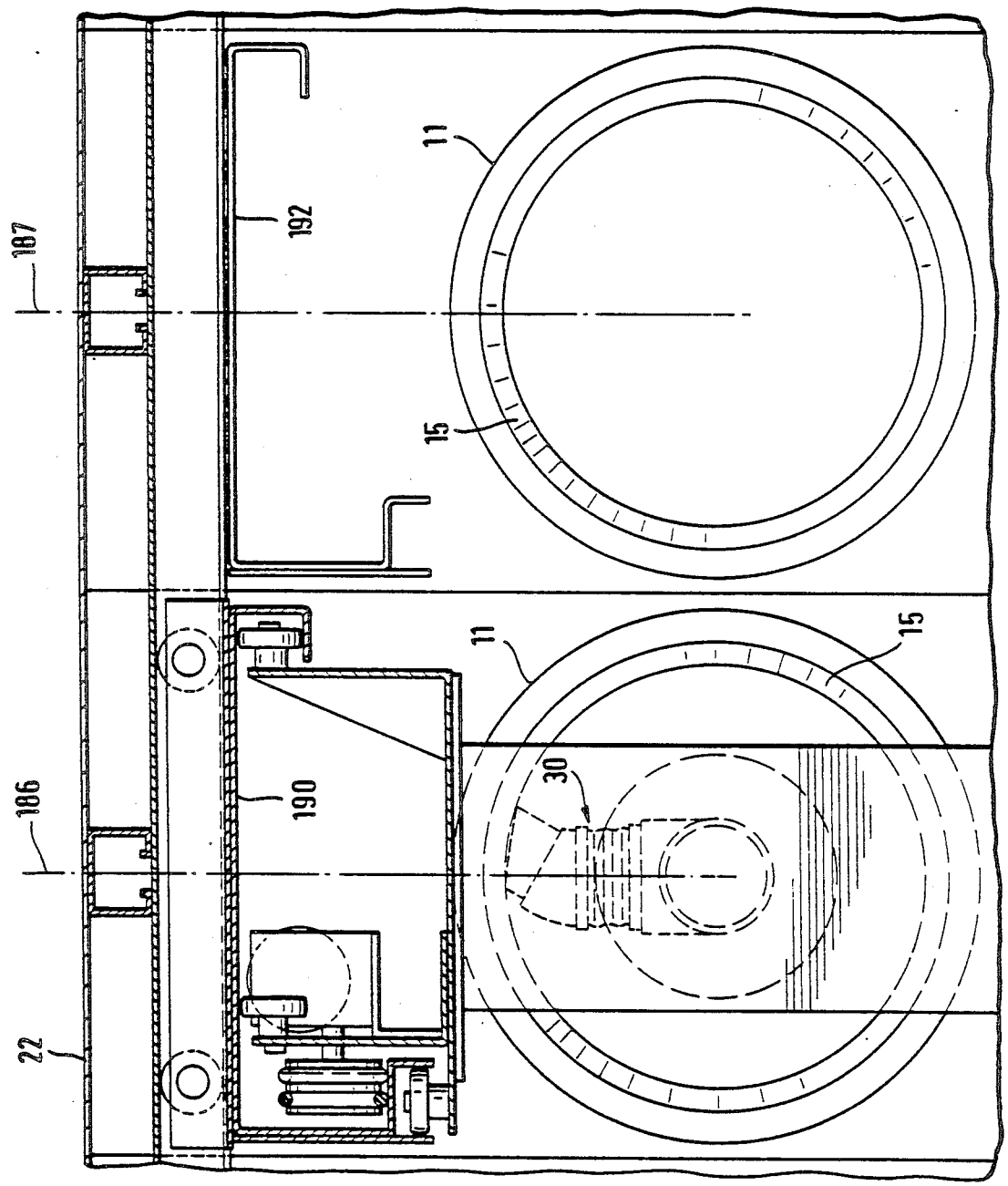
FIG. 11 is a sectional view taken along sectional line XI—XI of FIG. 10.

FIGS. 9-11 of the drawing show an arrangement in which the frame 90 is also omitted and is replaced by a system of parallel rails.

As shown in FIG. 11, a separate rail arrangement is provided for each column 186, 187 of filters 11. Thus, rail arrangement 190 is provided for column 186 and rail arrangement 192 is provided for column 187. These rail arrangements 190, 192 are stationary mounted under the roof of the housing 22.

The length of the rail arrangements 190 and 192 corresponds to the length of the filters 11 plus an added length, so that a carriage 194 which carries the suction box 196 and the suction pipes 33 can be moved in such a rail arrangement from the right to the left as shown in FIG. 10, so that the suction hoses 30 ar moved into the filters 11 of the respective columns 186 or 187 and suction off the interior surfaces of the filters along helical lines.

In the extended state shown in FIGS. 9-11, the carriage 194 is outside the rail arrangements 190 and 192 and in a transversely displaceable carriage 200 which is displaceable in a rail arrangement 202 whose exact shape is shown in FIG. 10. The rail arrangement 202 extends perpendicularly relative to the rail arrangements 190 and 192. The carriage 200 is suspended in the rail arrangement 202 by means of rollers 204, 206 and is guided in different directions by means of rollers 208, 210. Accordingly, the desired column 186 or 187 can be reached by means of the carriage 200 and suctioning can be performed by means of carriage 194 at the respective column. Thus, the frame 90 of FIG. 1 is not necessary.

FIG. 12 of the drawing shows an embodiment in which the suction pipe is formed by a telescopic pipe 210. As shown in FIG. 12, the telescopic pipe 210 consists of altogether ten segments, the largest of which is connected to the suction box 35. The suction hoses 30 are connected through an angle piece 43 to a rotating pipe 212 which is driven by means of an electric motor 216 through a belt 214. The pipe 212 is guided by means of support 220 with tight bearings, wherein the support is fastened to the support frame 222 which, in turn, is slidably guided in four rollers 224.

The rollers 224 are arranged on a carriage 226 which is displaceable by means of rollers 228 in a guide 230 fastened on the suction box 35.

Accordingly, the telescopic pipe 210 is extended by moving from left to right as seen in FIG. 12 the support frame 212 and the carriage 226 by means of a device which is not shown. Thus, the suction hoses 30 are again moved in a helical line along the inner surfaces of the filters 11 and the material which is suctioned off, for example, cotton residue or the like, is conducted through the telescopic pipe 210 to the suction box 235.

Of course, other embodiments in addition to the ones described above are possible.

For example, the suction pipes 33 could be arranged horizontally next to each other and work successively on the rows 111, 112 and 113 shown in FIG. 1.

While specific embodiments of the invention have been shown and described in detail to illustrate the inventive principles, it will be understood that the invention may be embodied otherwise without departing from such principles.

I claim:

1. A filter arrangement comprising at least one drum-type filter having a cylindrical inside and an outside, wherein flow occurs from the inside of the filter to the outside, the filter arrangement further comprising a suction device for suctioning-off the inside of the at least one drum-type filter along a helical line, the suction device including at least one suction hose and a suction nozzle provided at a free end of the suction hose, the suction nozzle being mounted so as to contact the inside of the at least one drum-type filter, the suction hose being attached to an end portion of a suction pipe, the suction hose comprising flexible hose means extending essentially in a radial direction of said drum-type filter and being mounted between the suction nozzle and the suction pipe for biasing said suction nozzle radially outwardly against the inside surface of said drum-type filter, said suction nozzle being supported solely by said suction hose, means for rotating the suction pipe, means for moving the end portion of the suction pipe back and forth in longitudinal direction of the at least one drum-type filter and out of the at least one filter, and means for moving the suction pipe when the suction pipe is moved out of the at least one drum-type filter in a direction transversely of the longitudinal direction of the at least one drum-type filter.

2. The filter arrangement according to claim 1, wherein the suction nozzle is rotatable in a direction of rotation, the suction nozzle extending inclined relative to a radial direction of the at least one filter against the direction of rotation.

3. The filter arrangement according to claim 2, wherein the suction nozzle includes an angle of approximately 20° to 50° with the radial direction.

4. The filter arrangement according to claim 1, wherein the flexible hose means is connected to the suction nozzle through an angle piece, and wherein the suction nozzle is replaceable.

5. The filter arrangement according to claim 1, comprising a plurality of suction hoses at the end portion of the suction pipe.

6. The filter arrangement according to claim 5, wherein two essentially diametrically oppositely located suction hoses are provided on the suction pipe.

7. The filter arrangement according to claim 1, wherein the suction pipe is rigid, wherein the means for moving the end portion of the suction pipe back and forth is a moving device which is movable in longitudinal direction of the at least one drum-type filter, and wherein the suction pipe is connected to the moving device.

8. The filter arrangement according to claim 7, wherein a plurality of suction pipes each provided with at least one suction hose are attached to the moving device, each suction pipe corresponding to at least one drum-type filter.

9. The filter arrangement according to claim 8, comprising means for connecting the suction pipes through the moving device to a common suction unit.

10. The filter arrangement according to claim 9, wherein the connection means to the common suction unit includes a flexible connecting hose.

11. The filter arrangement according to claim 10, comprising a stationary suction duct connected to the common suction unit, the flexible connecting hose being connected to the stationary suction duct so as to be movable along the suction duct, communication between the connecting hose and the suction duct being effected by means of a valve means.

12. The filter arrangement according to claim 7, comprising a suction duct connected to the moving device, the suction pipes being connected to the moving device through sealed rotary connections.

13. The filter arrangement according to claim 7, wherein the moving device comprises a drive means for rotating the suction pipes.

14. The filter arrangement according to claim 13, wherein the drive means comprises a belt drive for driving the sealed rotary connections.

15. The filter arrangement according to claim 7, comprising means for suspending the moving device.

16. The filter arrangement according to claim 7, wherein the moving device is suspended from a transverse moving device for effecting the movement of the moving device transversely of columns of drum-type filters arranged parallel to each other.

17. The filter arrangement according to claim 7, comprising a scissors-type drive for moving the moving device in the direction of the longitudinal axis of the drum-type filter.

18. The filter arrangement according to claim 17, wherein the scissors-type drive includes arms and a threaded spindle for driving the arms.

19. The filter arrangement according to claim 7, wherein the moving device includes a carriage, a first rail arrangement, the carriage being displaceable in the first rail arrangement in direction of the longitudinal axis of the at least one drum-type filter.

20. The filter arrangement according to claim 19, comprising a drive for displacing the carriage in the first rail arrangement.

21. The filter arrangement according to claim 19, comprising a second rail arrangement, the first rail arrangement being suspended from and extending transversely to the second rail arrangement, such that the first rail arrangement can be displaced parallel in direction of the second rail arrangement, so that several parallel columns of drum-type filters can be reached.

22. The filter arrangement according to claim 19, comprising a plurality of first rail arrangements extending parallel to each other, the first rail arrangements having ends facing away from the drum-type filters, a supplemental rail arrangement movable so as to be alignable with the end of one of the first rail arrangements on which the carriage is located at a given moment, the supplemental rail arrangement receiving the carriage when the carriage is moved out of the drum-type filters, and a second rail arrangement arranged transversely of the first rail arrangements for transporting the carriage from a first rail arrangement to another first rail arrangement.

23. The filter arrangement according to claim 7, wherein the moving device comprises a roller guide means for guiding the suction pipe, and wherein the suction pipe comprises a telescopic pipe which is extendable for insertion in the drum-type filter.

24. The filter arrangement according to claim 1, wherein the at least one drum-type filter has an open end, a truncated cone-shaped attachment provided at the open end.

25. The filter arrangement according to claim 24, wherein the closed end of the at least one drum-type filter is attached to a support frame.

26. The filter arrangement according to claim 1, wherein the at least one drum-type filter has a closed end, the closed end being a non-filter bottom.

* * * * *